US008002858B2

(12) United States Patent
Kim et al.

(10) Patent No.: US 8,002,858 B2
(45) Date of Patent: Aug. 23, 2011

(54) CUTTING SEGMENT, METHOD FOR MANUFACTURING CUTTING SEGMENT, AND CUTTING TOOL COMPRISING THE SAME

(75) Inventors: Soo-Kwang Kim, Portofino, CA (US); Hee-Dong Park, Kyungki-do (KR)

(73) Assignees: EHWA Diamond Industrial Co., Ltd., Osan (KR); General Tool, Inc., Irvine, CA (US)

( * ) Notice: Subject to any disclaimer, the term of this patent is extended or adjusted under 35 U.S.C. 154(b) by 757 days.

(21) Appl. No.: 11/911,510

(22) PCT Filed: Apr. 14, 2006

(86) PCT No.: PCT/KR2006/001382
§ 371 (c)(1), (2), (4) Date: Feb. 22, 2008

(87) PCT Pub. No.: WO2006/110010
PCT Pub. Date: Oct. 19, 2006

(65) Prior Publication Data
US 2008/0148648 A1   Jun. 26, 2008

(30) Foreign Application Priority Data

Apr. 14, 2005  (KR) .................. 10-2005-0031112

(51) Int. Cl.
*B24B 7/00* (2006.01)
*B28D 1/00* (2006.01)
(52) U.S. Cl. ........................................... 51/307; 51/293
(58) Field of Classification Search ............ 51/293, 51/307, 309
See application file for complete search history.

(56) References Cited

U.S. PATENT DOCUMENTS

| | | |
|---|---|---|
| 2,811,960 A | 11/1957 | Fessel |
| 3,176,675 A | 4/1965 | Bomba |
| 4,883,500 A | 11/1989 | Deakins et al. |
| 5,049,165 A | 9/1991 | Tselesin |
| 5,092,082 A | 3/1992 | Padberg et al. |
| 5,433,187 A | 7/1995 | Hayasaka et al. |
| 5,620,489 A | 4/1997 | Tselesin |

(Continued)

FOREIGN PATENT DOCUMENTS

CH        597 954        4/1978

(Continued)

*Primary Examiner* — Jerry Lorengo
*Assistant Examiner* — Jared Wood
(74) *Attorney, Agent, or Firm* — McDermott Will & Emery LLP (57) ABSTRACT

A cutting segment for a cutting tool used for cutting or drilling brittle workpieces, such as stone, brick, concrete and asphalt, a method for manufacturing the segment, and a cutting tool comprising the segment are disclosed. The segment comprises layers of diamond particles and two kinds of plate-shaped metal matrix layers comprising soft and hard metal matrix layers having different ductility. The plate-shaped metal matrix layers are arranged perpendicular to a cutting surface while being parallel to a cutting direction, and are alternately stacked perpendicular to the cutting direction. The layers of diamond particles are suitably arranged in the plate-shaped soft and hard metal matrix layers. The segment and the cutting tool comprising the same have excellent cutting ability, and the manufacturing process thereof can be simplified, thereby remarkably enhancing productivity.

6 Claims, 10 Drawing Sheets

| U.S. PATENT DOCUMENTS | | | |
|---|---|---|---|
| 5,725,421 A | 3/1998 | Goers et al. | |
| 6,159,286 A | 12/2000 | Sung | |
| 6,626,167 B2 | 9/2003 | Kim et al. | |
| 7,124,753 B2 | 10/2006 | Sung | |
| 7,134,430 B2 | 11/2006 | Kim et al. | |
| 7,261,925 B2 | 8/2007 | Nesbitt | |
| 7,337,775 B2 | 3/2008 | Kim et al. | |
| 2002/0077054 A1 | 6/2002 | Sung | |
| 2002/0173234 A1 | 11/2002 | Sung et al. | |
| 2003/0084894 A1* | 5/2003 | Sung | 125/12 |
| 2003/0089364 A1 | 5/2003 | Kim et al. | |
| 2003/0109204 A1 | 6/2003 | Sung | |
| 2003/0114085 A1 | 6/2003 | Choi et al. | |
| 2004/0112359 A1 | 6/2004 | Sung | |

| FOREIGN PATENT DOCUMENTS | | | |
|---|---|---|---|
| EP | 452618 A1 * | 10/1991 | |
| JP | 36-017249 | 9/1951 | |
| JP | 60-0092406 | 5/1985 | |
| JP | 60-217064 | 10/1985 | |
| JP | 03-161278 | 7/1991 | |
| JP | 2003-103468 | 4/2003 | |
| KR | 1999-011778 | 2/1999 | |
| KR | 2003-0027434 | 4/2003 | |
| KR | 2003-0067394 | 8/2003 | |
| KR | 2004-0006361 | 1/2004 | |
| WO | WO 03066275 | 8/2003 | |
| WO | WO2005/014243 A2 | 2/2005 | |

* cited by examiner

CUTTING SEGMENT, METHOD FOR MANUFACTURING CUTTING SEGMENT, AND CUTTING TOOL COMPRISING THE SAME

TECHNICAL FIELD

The present invention relates to a cutting segment for a cutting tool used for cutting or drilling brittle workpieces, such as stone, brick, concrete and asphalt, a method for manufacturing the segment, and a cutting tool comprising the segment. More particularly, the present invention relates to a cutting segment for a cutting tool, which uses a plate-shaped metal matrix instead of a powdered metal matrix, a method of manufacturing the segment, and a cutting tool comprising the segment.

BACKGROUND ART

In order to cut or drill brittle workpieces, such as stone, brick, concrete and asphalt, it is necessary to provide an abrasive material having hardness higher than that of the workpieces.

As for the abrasive material, synthetic diamond particles, natural diamond particles, nitrogen boride and cemented carbide are well known in the art, and particularly, the synthetic diamond particles have been most widely used in the art of cutting tools among these materials.

Synthetic diamond (referred to as "diamond" hereinafter) was invented in the 1950's, and is known to have a higher hardness than any other material on earth. Due to this property, diamond is widely used for cutting tools, grinding tools and the like.

Particularly, the diamond has been widely used in the field of stone machining when cutting or grinding a variety of stones, such as marble, granite and the like, and in the field of construction when cutting or grinding concrete structures.

A cutting segment (also referred to as "segment" hereinafter) comprising diamond particles as the abrasive material, and a cutting tool comprising the same will now be described.

Typically, a segment type diamond tool comprises a plurality of segments, each having diamond particles distributed thereon, and a steel core holding the segment.

Figure 1:
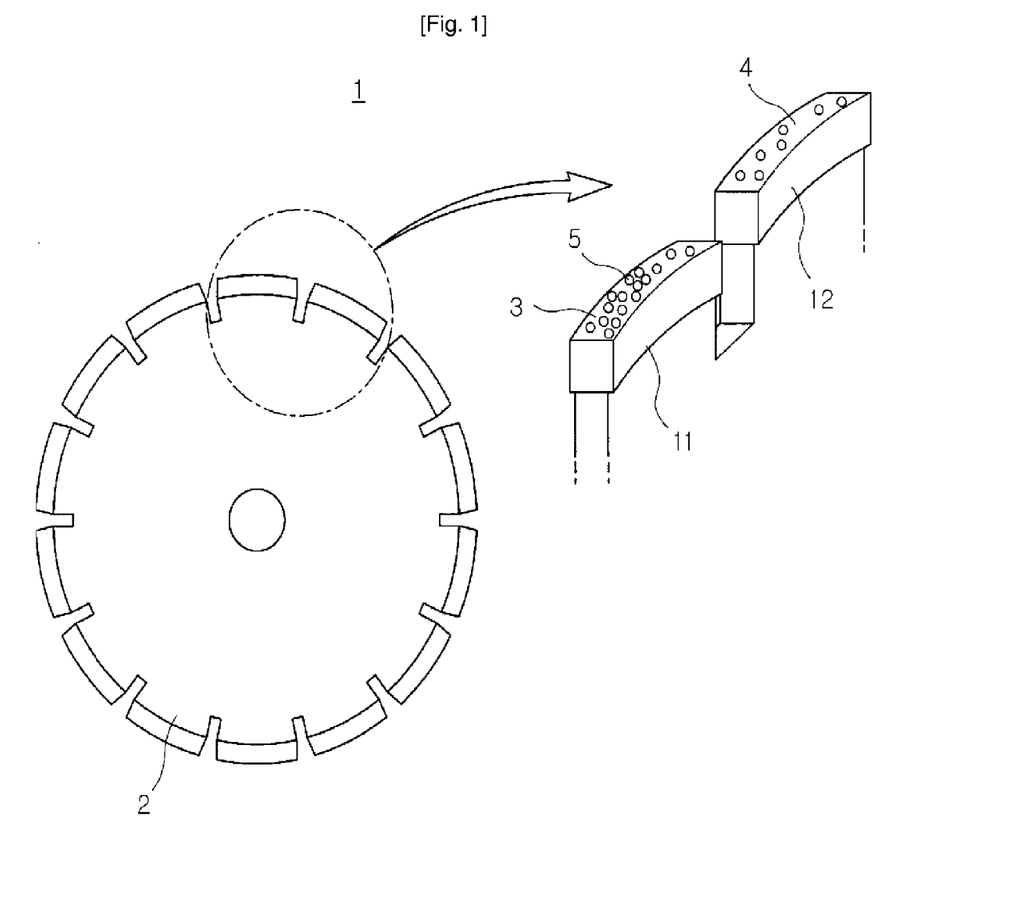
FIG. 1 is a diagram illustrating an example of a diamond tool with diamond particles randomly distributed on a cutting surface of a segment.

FIG. 1 shows an example of the segment type diamond tool.

Referring to FIG. 1, the segment type diamond tool comprises a plurality of segments 11 and 12 fixed to a disk-shaped steel core 2 and having diamond particles 5 randomly distributed in each of the segments 11 and 12.

The segments are manufactured according to powder metallurgy, in which the diamond particles are mixed with metal powders acting as a matrix, and are then compacted and sintered.

As mentioned above, when the diamond particles are mixed with the metal powders, the diamond particles are not uniformly distributed among the metal powders, resulting in decreased cutting efficiency of the diamond particles and reduction in life span.

That is, when mixing the diamond particles and the metal powders acting as the matrix, differences in sizes and specific gravities between the particles cause segregation of the diamond particles, thereby generating non-uniform distribution of the diamond particles among the metal powders. As a result, as shown in FIG. 1, a cutting surface 3 in each segment with an excessively large amount of diamond particles distributed thereon or a cutting surface 4 with an excessively small amount of diamond particles distributed thereon can be formed.

When the diamond particles are segregated as described above, not only is the cutting efficiency of the cutting tool deteriorated, but the life span of the cutting tool is also reduced.

Figure 2:
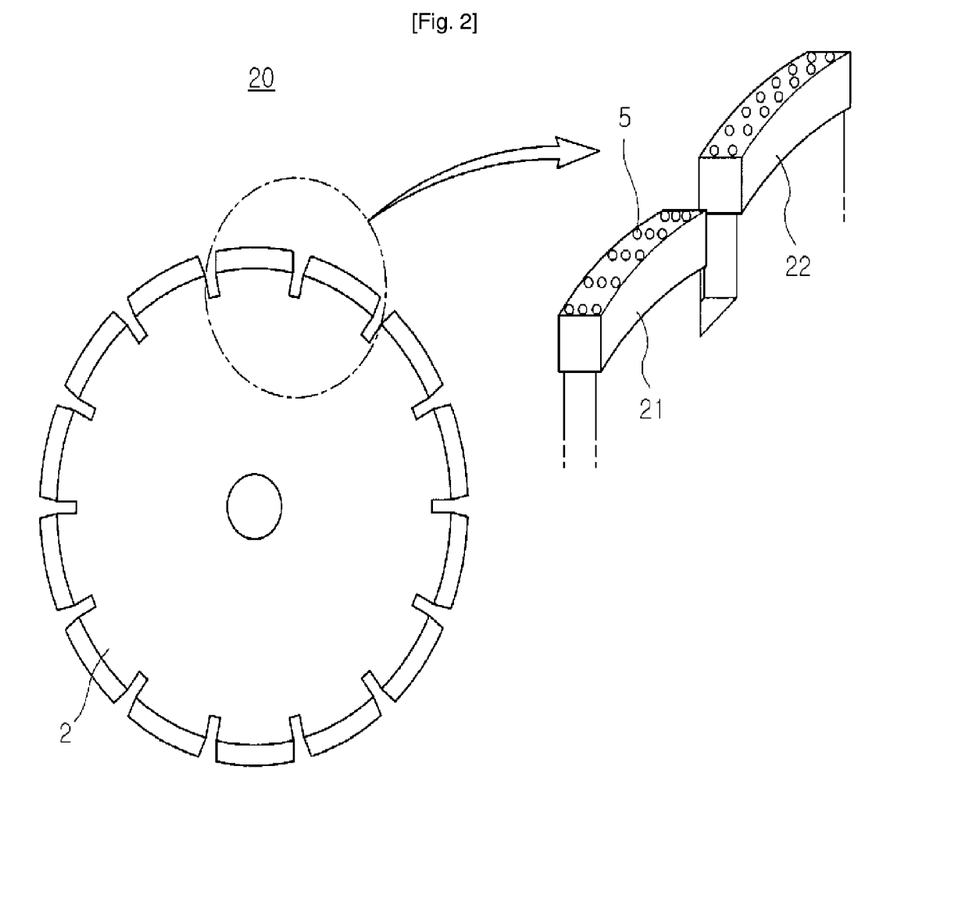
FIG. 2 is a diagram illustrating an example of a diamond tool with the diamond particles uniformly distributed on the cutting surface of the segment.

As a technology for solving the above problems caused by the segregation of the diamond particles, a patterning technology, which distributes the diamond particles in a predetermined pattern, is suggested and an example thereof is illustrated in FIG. 2.

FIG. 2 shows another example of a segment type diamond tool 20 in which the diamond particles are distributed in the predetermined pattern.

Referring to FIG. 2, each of the segments 21 and 22 has the diamond particles 5 distributed thereon in the predetermined pattern. That is, the diamond particles 5 are uniformly distributed in each of the segments 21 and 22.

According to a patterning technology, instead of mixing the metal powders and the diamond particles, the metal powders and the diamond particles are arranged in layers by repeating a process for arranging the diamond particles on the metal powder matrix in a predetermined pattern and a process for positioning the metal powder matrix on the diamond particles, and are then compacted into a predetermined compact, followed by sintering, thereby providing the segment.

Although the patterning technology for the diamond particles can solve the problems caused by the segregation of the diamond particles, intrinsic problems caused by the use of the powdered metal matrix cannot be solved.

That is, when manufacturing the segment, if the metal powders are used for the matrix, the metal powders are subjected to a higher pressure during a process of compacting the metal matrix. During the process of compacting the metal matrix, due to severe wear of a compaction die by the diamond particles, variation in the thickness of the matrix or breakage of the matrix frequently occurs, thereby lowering productivity. Furthermore, in severe cases, dimensions of the matrix are changed, so that the segments have different dimensions, respectively, resulting in performance variation and deterioration of the diamond tool.

Further, even though the metal powders for the matrix can be manufactured by various methods using the same components, manufacturing costs of the metal powders are remarkably high compared with a bulk of metal having a different shape, such as plate, coil, rod, and the like.

Additionally, when manufacturing the segments through powder metallurgy, a process for mixing the diamond particles and the metal powders, a process for compacting the mixture of the diamond particles and the metal powders into a predetermined compact, and a process for sintering the compact must be sequentially preformed, complicating the manufacturing processes.

DISCLOSURE OF INVENTION

Technical Problem

The present invention has been made to solve the above problems, and it is an object of the present invention to provide a cutting segment, which uses a metal plate instead of powdered metal as a matrix, thereby realizing an excellent cutting ability, a simplified manufacturing process and remarkably reduced manufacturing costs.

It is another object of the present invention to provide a method of manufacturing the segment as described above.

It is yet another object of the present invention to provide a cutting tool comprising the segments as described above.

Technical Solution

In accordance with one aspect of the present invention, the above and other objects can be accomplished by the provision of a cutting segment, comprising: a plurality of layers, each comprising layers of diamond particles and two kinds of plate-shaped metal matrix layers having different ductility, wherein the two kinds of plate-shaped metal matrix layers are arranged perpendicular to a cutting surface while being parallel to a cutting direction, and are alternately stacked perpendicular to the cutting direction, and wherein each layer of diamond particles has diamond particles surrounded by the metal matrix layer having relatively high ductility among the metal matrix layers and positioned in a row of diamond particles on the cutting surface.

In accordance with another aspect of the present, a cutting segment is provided, comprising: a plurality of layers, each comprising layers of diamond particles, and two kinds of plate-shaped metal matrix layers comprising at least one soft metal matrix layer having relatively high ductility and at least one hard metal matrix layer having relatively low ductility, wherein the two kinds of plate-shaped metal matrix layers are arranged perpendicular to a cutting surface while being parallel to a cutting direction, and are alternately stacked perpendicular to the cutting direction, and wherein each layer of diamond particles has diamond particles, a portion of each diamond particle being located in the soft metal matrix layer and the other portion of each diamond particle being located in the hard metal matrix layer, the diamond particles being positioned in a row of diamond particles on the cutting surface.

The portion of each diamond particle of one layer of diamond particles is located in each metal matrix layer.

The portion of each diamond particle of two layers of diamond particles is located in each metal matrix layer.

In accordance with still another aspect of the present invention, a method for manufacturing a cutting segment is provided, comprising the steps of: preparing two kinds of plate-shaped metal matrices comprising plate-shaped soft metal matrices having relatively high ductility and plate-shaped hard metal matrices having relatively low ductility; arranging diamond particles on a first soft metal matrix among the plate-shaped soft metal matrices such that the diamond particles are positioned in a row of diamond particles on a cutting surface; stacking a second soft metal matrix on the diamond particles; stacking a first hard metal matrix among the plate-shaped hard metal matrices on the second soft metal matrix; stacking a third soft metal matrix on the first hard metal matrix, followed by arranging other diamond particles on the third soft metal matrix such that the other diamond particles are positioned in a row of diamond particles on the cutting surface, stacking a fourth soft metal matrix on the diamond particles, and stacking a second hard metal matrix on the fourth soft metal matrix; repeating the above steps to prepare a stack having a desired thickness; and heating and compressing the stack such that components constituting the stack are combined.

In accordance with still another aspect of the present invention, a method for manufacturing a cutting segment is provided, comprising the steps of: preparing two kinds of plate-shaped metal matrices comprising plate-shaped soft metal matrices having relatively high ductility and plate-shaped hard metal matrices having relatively low ductility; arranging diamond particles on a first hard metal matrix among the plate-shaped hard metal matrices such that the diamond particles are positioned in a row of diamond particles on a cutting surface; stacking a first soft metal matrix among the plate-shaped soft metal matrices on the diamond particles; stacking a second hard metal matrix on the first soft metal matrix, followed by arranging other diamond particles on the second hard metal matrix such that the other diamond particles are positioned in a row of diamond particles on the cutting surface, and stacking a second soft metal matrix on the diamond particles; repeating the above steps to prepare a stack having a desired thickness; and heating and compressing the stack such that components constituting the stack are combined.

In accordance with yet another aspect of the present invention, a method for manufacturing a cutting segment is provided, comprising the steps of: preparing two kinds of plate-shaped metal matrices comprising plate-shaped soft metal matrices having relatively high ductility and plate-shaped hard metal matrices having relatively low ductility; arranging diamond particles on a first hard metal matrix among the plate-shaped hard metal matrices such that the diamond particles are positioned in a row of diamond particles on a cutting surface; stacking a first soft metal matrix among the plate-shaped soft metal matrices on the diamond particles; arranging other diamond particles on the first soft metal matrix such that the other diamond particles are positioned in a row of diamond particles on the cutting surface, followed by stacking a second hard metal matrix on the diamond particles, arranging other diamond particles on the second hard metal matrix such that the other diamond particles are positioned in a row of diamond particles on the cutting surface, and stacking a second soft metal matrix on the other diamond particles; repeating the above steps to prepare a stack having a desired thickness; and heating and compressing the stack such that components constituting the stack are combined.

BRIEF DESCRIPTION OF THE DRAWINGS

The above and other objects, features and other advantages of the present invention will be more clearly understood from the following detailed description taken in conjunction with the accompanying drawings.

BEST MODE FOR CARRYING OUT THE INVENTION

Various embodiments within the scope of the invention will now be described in detail with reference to the accompanying drawings.

The present invention can be applied to a segment for a cutting tool used for cutting or drilling brittle workpieces, such as stone, brick, concrete and asphalt, and a cutting tool comprising the segments.

The segment for the cutting tool comprises diamond particles directly performing a cutting operation when cutting the workpieces, and metal matrices holding the diamond particles.

Conventionally, powdered metal matrices have been used when manufacturing the segment.

When manufacturing the segment using the powdered metal matrices, there are problems in that the diamond particles are segregated, reducing not only cutting efficiency of the cutting tool, but also life span thereof.

Further, when manufacturing the segment using the powdered metal matrices, a process of mixing the diamond particles and the metal powders, a process of compacting the mixture of the diamond particles and the powders into a predetermined compact, and a process of sintering the compact must be sequentially carried out.

Thus, when manufacturing the segment using the powdered metal matrices, the manufacturing processes become complicated, thereby increasing manufacturing costs.

As a technology for solving the above problems caused by segregation of the diamond particles, a patterning technology, which distributes the diamond particles in a predetermined pattern, was suggested.

According to the patterning technology, instead of mixing the metal powders and the diamond particles, after the powdered metal matrices and the diamond particles are arranged in layers by repeating a processes of arranging the diamond particles on a powdered metal matrix in a predetermined pattern and then placing another powdered metal matrix on the diamond particles, the layers are compacted into a predetermined compact and sintered, thereby producing the segment.

Although the patterning technology of the diamond particles can solve the problems caused by the segregation of the diamond particles, the problems of complicated manufacturing process and increase in manufacturing costs caused by use of the powdered metal matrices cannot be solved.

The principle of the invention is that plate-shaped metal matrices are used from the beginning of the manufacturing process instead of the powdered metal matrix.

If the segment is manufactured using the plate-shaped metal matrices from the beginning of the process, not only are the diamond particles distributed without segregation as is desired, but also the manufacturing process can be simplified, thereby minimizing the manufacturing costs.

Additionally, the principle of the invention is also that two kinds of metal matrices having different ductility, that is, soft metal matrices having relatively high ductility and hard metal matrices having relatively high ductility, are used as the plate-shaped metal matrices.

The segment of the invention comprises layers of diamond particles, and two kinds of plate-shaped metal matrix layers having different ductility, that is, soft metal matrix layers having relatively high ductility and hard metal matrix layers having relatively low ductility.

Herein, the term "soft" or "hard" refers not to an absolute soft or hard value, but to a relative value between these metal matrix layers.

The plate-shaped metal matrix layers are arranged perpendicular to a cutting surface while being parallel to a cutting direction, and are alternately stacked perpendicular to the cutting direction.

Each layer of diamond particles has diamond particles surrounded by the soft metal matrix layer having relatively high ductility among the metal matrix layers.

In a segment in accordance with another embodiment, each layer of diamond particles has diamond particles, a portion of each diamond particle being located in the soft metal matrix layer having relatively high ductility among the metal matrix layers and the other portion of each diamond particle being located in the hard metal matrix layer having relatively low ductility among the metal matrix layers. At this time, it is desirable that a half or more of the size of the diamond particle be located in the soft metal matrix layer.

The segment of this embodiment is constructed such that the thickness of the soft metal matrix layer is greater than that of the hard metal matrix layer so as to allow a portion of each diamond particle of one layer of diamond particles to be located in each metal matrix layer.

Additionally, the segment of this embodiment is constructed such that the thickness of the soft metal matrix layer is smaller than that of the hard metal matrix layer so as to allow a portion of each diamond particle of one layer of diamond particles to be located in each metal matrix layer while allowing the portion of each diamond particle to be surrounded by the soft metal matrix layer.

In a segment in accordance with still another embodiment, a portion of each diamond particle of two layers of diamond particles is located in each metal matrix layer.

According to the invention, the plate-shaped metal matrix layers consist of the two kinds of plate-shaped metal matrix layers having different ductility, that is, the soft metal matrix layers having relatively high ductility and the hard metal matrix layers having relatively low ductility.

The metal matrix layer can be constructed of a ferrous or non-ferrous material, and alternatively of a material selected from the group consisting of steel, aluminum alloys, low melting point nickel alloys, copper alloys, silver alloys, and brass.

In another embodiment, the hard metal matrix layer is constructed of steel, and the soft metal matrix layer is constructed of a material selected from the group consisting of low melting point nickel alloys, copper alloys, silver alloys, and brass.

The plate-shaped metal matrix layers may be constructed of a rolled material or a sintered material, and are preferably constructed of the rolled material.

All of the plate-shaped metal matrix layers may be constructed of the rolled material. Alternatively, some of the plate-shaped metal matrix layers may be constructed of the sintered material.

In yet another embodiment, the plate-shaped metal matrix layers are constructed of a hot rolled steel plate or a cold rolled steel plate.

The present invention will now be described in detail with reference to the drawings.

Figure 3:
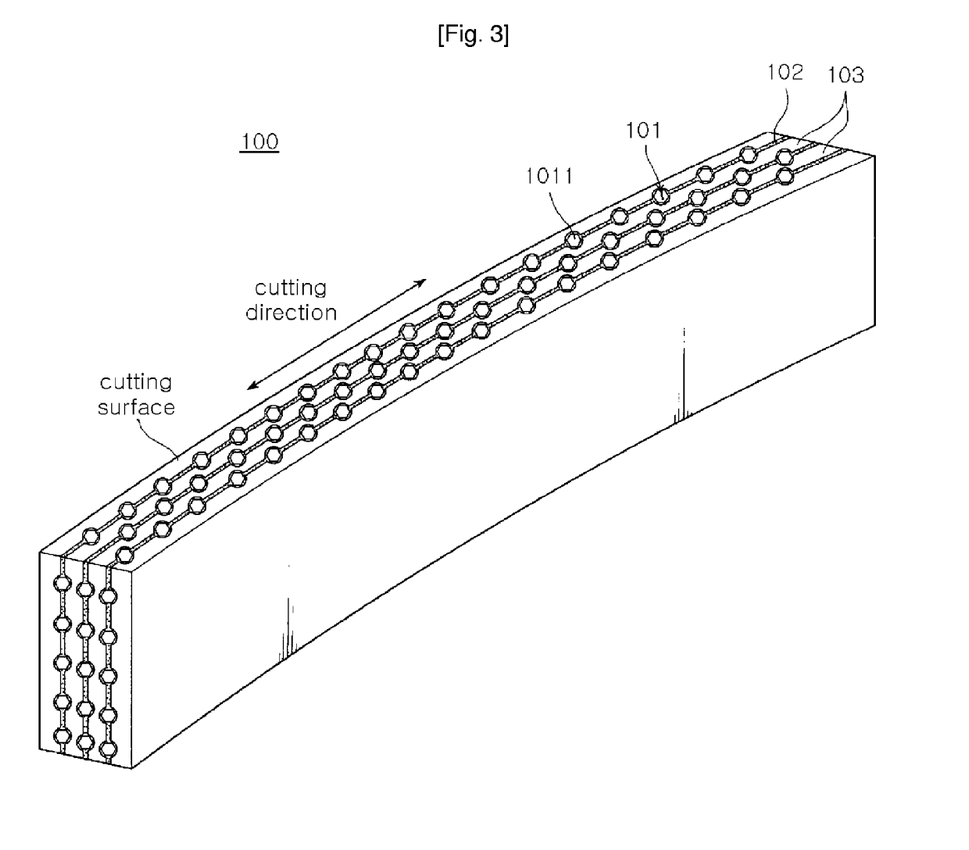
FIG. 3 is a diagram illustrating a cutting segment in accordance with one embodiment of the present invention.

FIG. 3 is a diagram illustrating an example of a cutting segment according to the present invention.

Referring to FIG. 3, a cutting segment 100 of the invention comprises layers of diamond particles 101, and two kinds of plate-shaped metal matrix layers having different ductility, that is, soft metal matrix layers 102 having relatively high ductility and hard metal matrix layers 103 having relatively low ductility.

The plate-shaped metal matrix layers 102 and 103 are arranged perpendicular to a cutting surface while being parallel to a cutting direction, and are alternately stacked perpendicular to the cutting direction.

Each layer of diamond particles 101 has diamond particles 1011 surrounded by the soft metal matrix layer 102 having relatively high ductility among the metal matrix layers.

Each layer of the diamond particles 101 is constructed such that the diamond particles 1011 are positioned as a row of diamond particles on the cutting surface.

Figure 4:
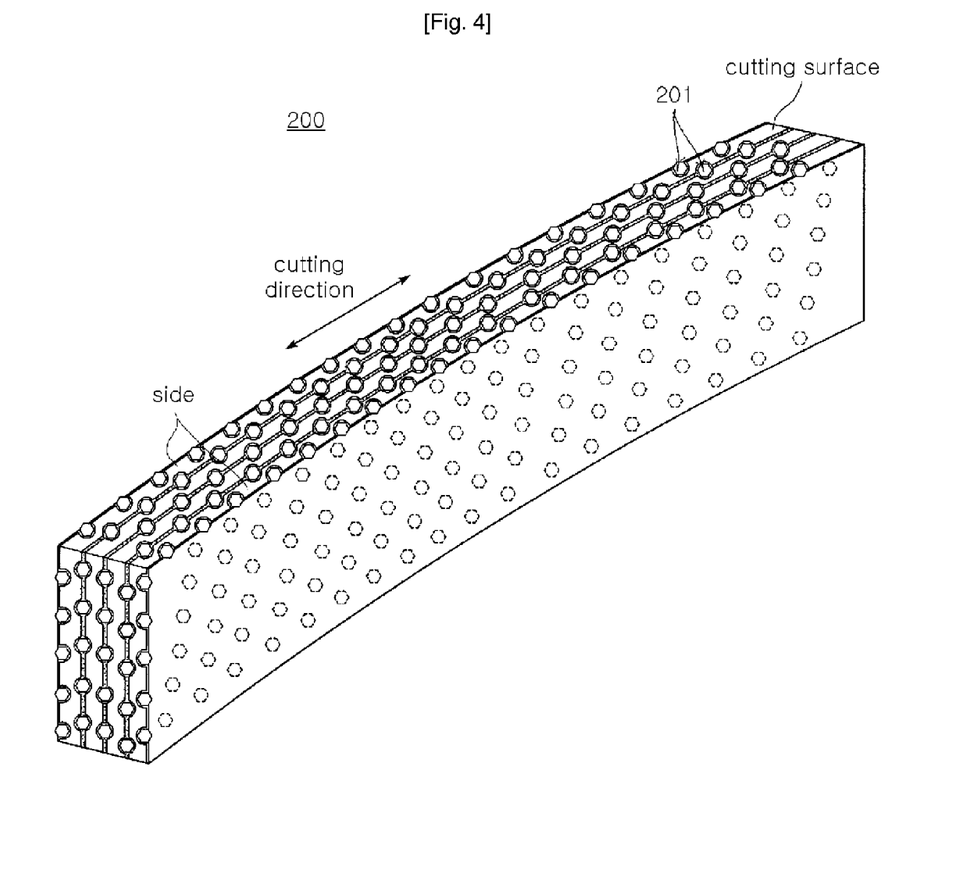
FIG. 4 is a diagram illustrating a cutting segment in accordance with another embodiment of the present invention.

FIG. 4 is a diagram illustrating a segment 200 according to another embodiment of the invention, in which layers of diamond particle 201 are arranged on both sides of the segment shown in FIG. 3.

Even if the thickness of the metal matrix layer having relatively high ductility is smaller than that of the layer of diamond particles, the metal matrix layers can surround the diamond particles.

Accordingly, there is no restriction in the thickness of the metal matrix layer having relatively high ductility. However, the metal matrix layer having relatively high ductility is preferably thinner than the layer of diamond particles.

Meanwhile, in a segment according to yet another embodiment of the invention, each layer of diamond particles has diamond particles, a portion of each diamond particle being located in the soft metal matrix layer having relatively high ductility and the other portion of each diamond particle being located in the hard metal matrix layer having relatively low ductility among the metal matrix layers.

Figure 5:
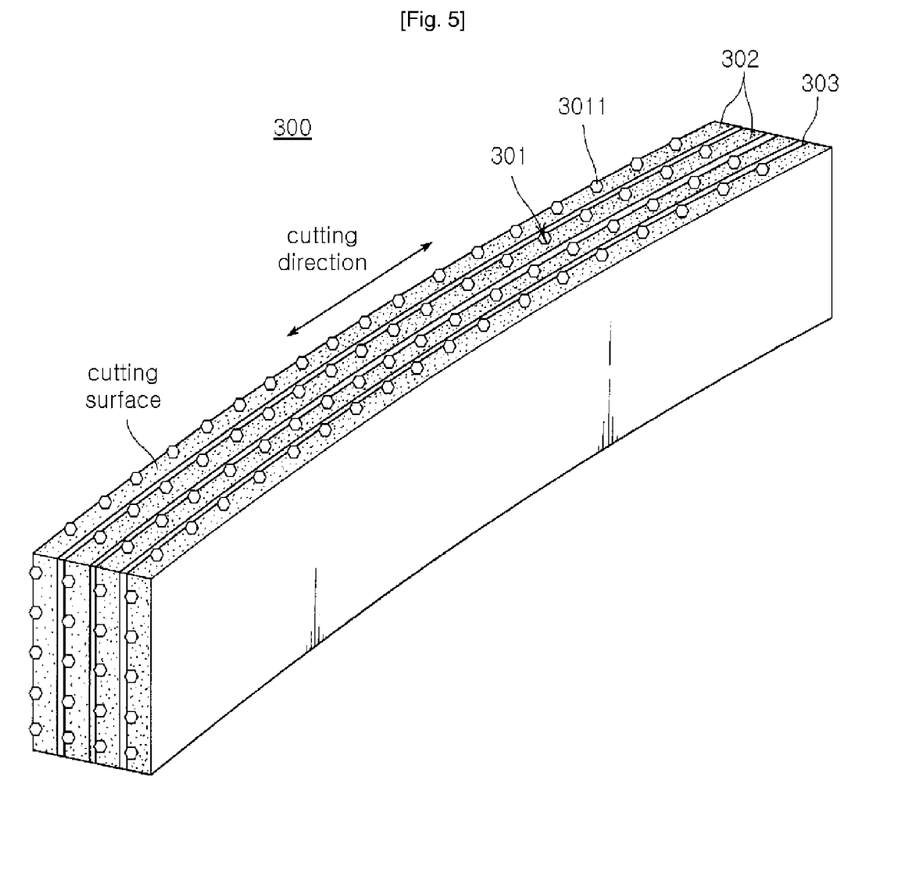
FIG. 5 is a diagram illustrating a cutting segment in accordance with still another embodiment of the present invention.
Figure 6:
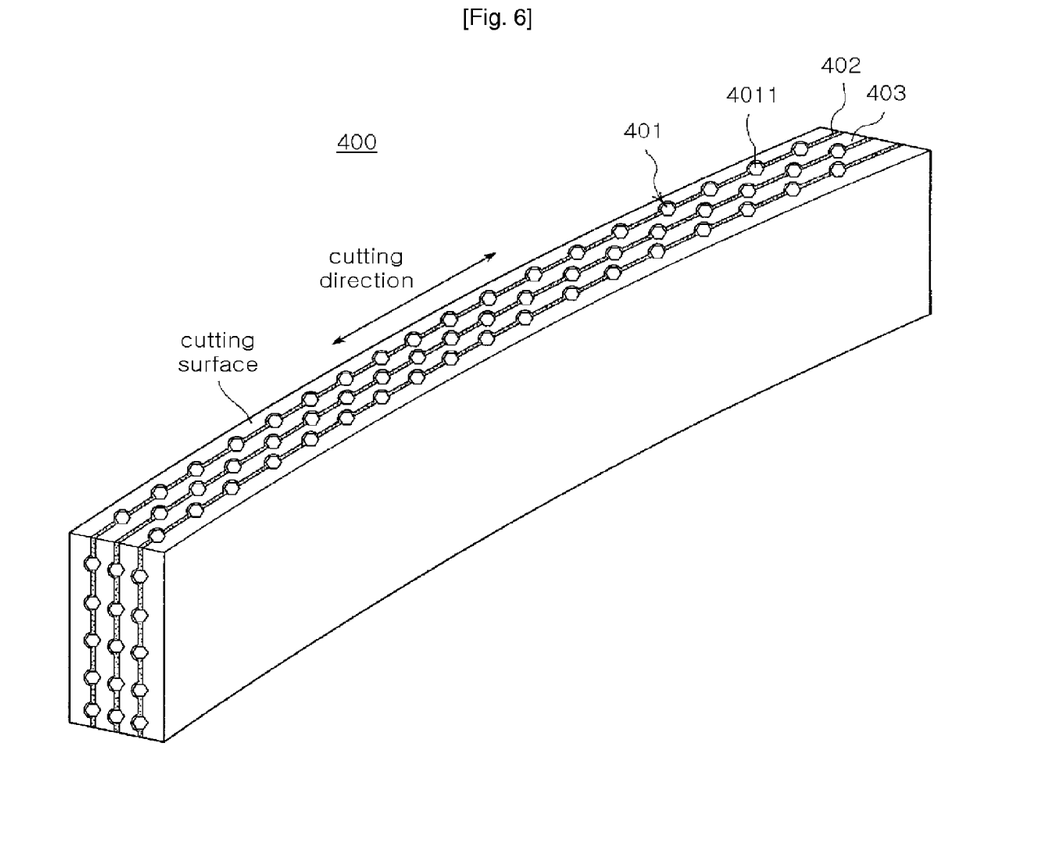
FIG. 6 is a diagram illustrating a cutting segment in accordance with still another embodiment of the present invention.
Figure 7:
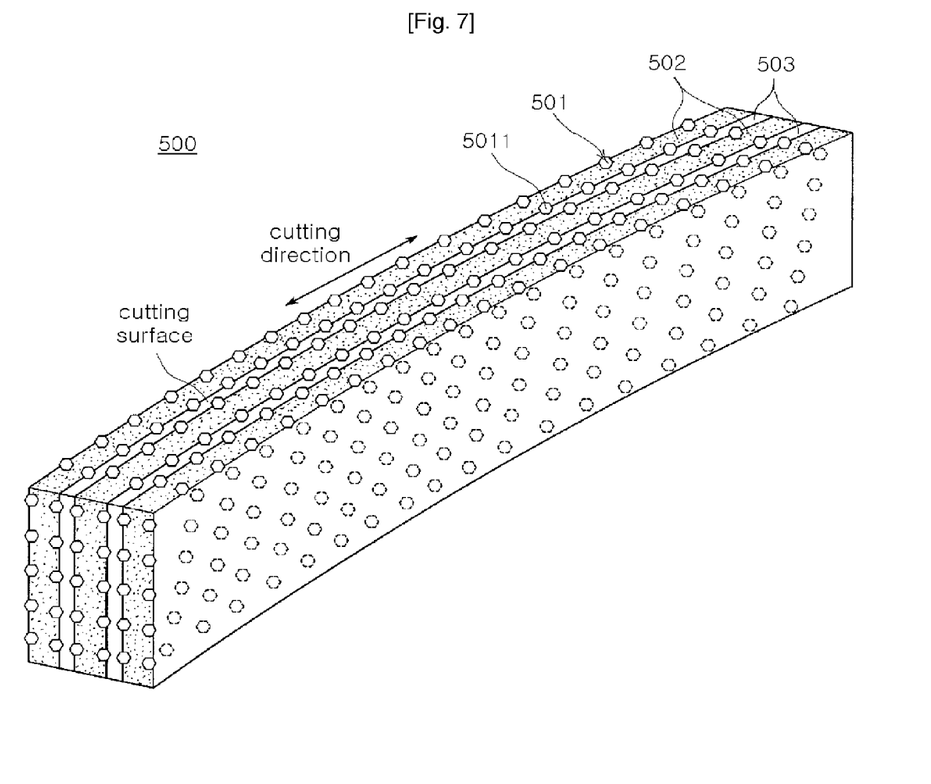
FIG. 7 is a diagram illustrating a cutting segment in accordance with yet another embodiment of the present invention.

FIGS. 5 to 7 show segments in accordance with other embodiments of the invention, respectively.

As shown in FIG. 5, a cutting segment 300 according to another embodiment of the invention comprises layers of diamond particles 301, and two kinds of plate-shaped metal matrix layers having different ductility, that is, soft metal matrix layers 302 having relatively high ductility and hard metal matrix layers 303 having relatively low ductility.

The plate-shaped metal matrix layers 302 and 303 are arranged perpendicular to a cutting surface while being parallel to a cutting direction, and are alternately stacked perpendicular to the cutting direction.

Each layer of diamond particles 301 has diamond particles 3011, in which a portion of each diamond particle is located in the soft metal matrix layer 302 and the other portion of each diamond particle is located in the hard metal matrix layer 303.

The portion of each diamond particle 3011 of one layer of diamond particles 301 is located in each metal matrix layer 302 or 303.

The thickness of the soft metal matrix layer 302 is greater than that of the hard metal matrix layer 303.

Preferably, a half or more of the size of the diamond particle in each diamond particle layer is located in the soft metal matrix layer.

Each layer of diamond particles 301 is constructed such that the diamond particles 3011 are positioned as a row of diamond particles on the cutting surface.

FIG. 6 shows a cutting segment according to still another embodiment of the invention.

As shown in FIG. 6, a cutting segment 400 is different from the cutting segment 300 of FIG. 5 in that the thickness of a soft metal matrix layer 402 is smaller than that of a hard metal matrix layer 403, and in that a portion of each diamond particle 4011 constituting a layer of diamond particles 401 is surrounded by the soft metal matrix layer.

FIG. 7 shows a cutting segment according to yet another embodiment of the invention.

As shown in FIG. 7, a cutting segment 500 is different from the cutting segment 300 of FIG. 5 in that a portion of each diamond particle 5011 of two layers of diamond particles 501 is located in each metal matrix layer 502 and 503.

The soft metal matrix layer having relatively high ductility preferably has a thickness greater than that of the hard metal matrix layer, and greater than an average diameter of the diamond particles.

As shown in FIG. 4, the layers of diamond particles 301, 401 and 501 may be located at both sides of the segments 300, 400 and 500, respectively.

In accordance with the invention, a cutting tool having the segments as described above is provided.

One example of a method for manufacturing the segment according to the invention will be described in detail with reference to FIGS. 8 to 10.

Preparation of Plate-Shaped Metal Matrices

In order to manufacture a segment according to the invention, two kinds of plate-shaped metal matrices constructed of a ferrous or non-ferrous material having different ductility are prepared.

That is, soft metal matrices having relatively high ductility and hard metal matrices having relatively high ductility must be prepared.

Each metal matrix can be constructed of a ferrous or non-ferrous material, and more preferably of a material selected from the group consisting of steel, aluminum alloys, low melting point nickel alloys, copper alloys, silver alloys, and brass.

In another embodiment, the hard metal matrices are constructed of steel, and the soft metal matrices are constructed of a material selected from the group consisting of the low melting point nickel alloys, copper alloys, silver alloys, and brass.

The plate-shaped metal matrices are prepared to have a suitable shape corresponding to the segment to be manufactured.

The plate-shaped metal matrices may be constructed of a rolled material or a sintered material, and are particularly constructed of the rolled material.

In one embodiment, the hard metal matrices are constructed of a hot rolled steel plate or a cold rolled steel plate.

All of the plate-shaped metal matrices may be constructed of the rolled material. Alternatively, some of the plate-shaped metal matrices may be constructed of the sintered material.

When using the rolled material as the plate-shaped metal matrices, the rolled material has a density near a theoretical density limit. Accordingly, the segment using the rolled material as each of the metal matrix exhibits excellent mechanical properties, as compared with the segment produced by compacting and sintering a powdered metal matrix.

Arrangement of Diamond Particles and Stacking of Plate-shaped Metal Matrices

Figure 8:
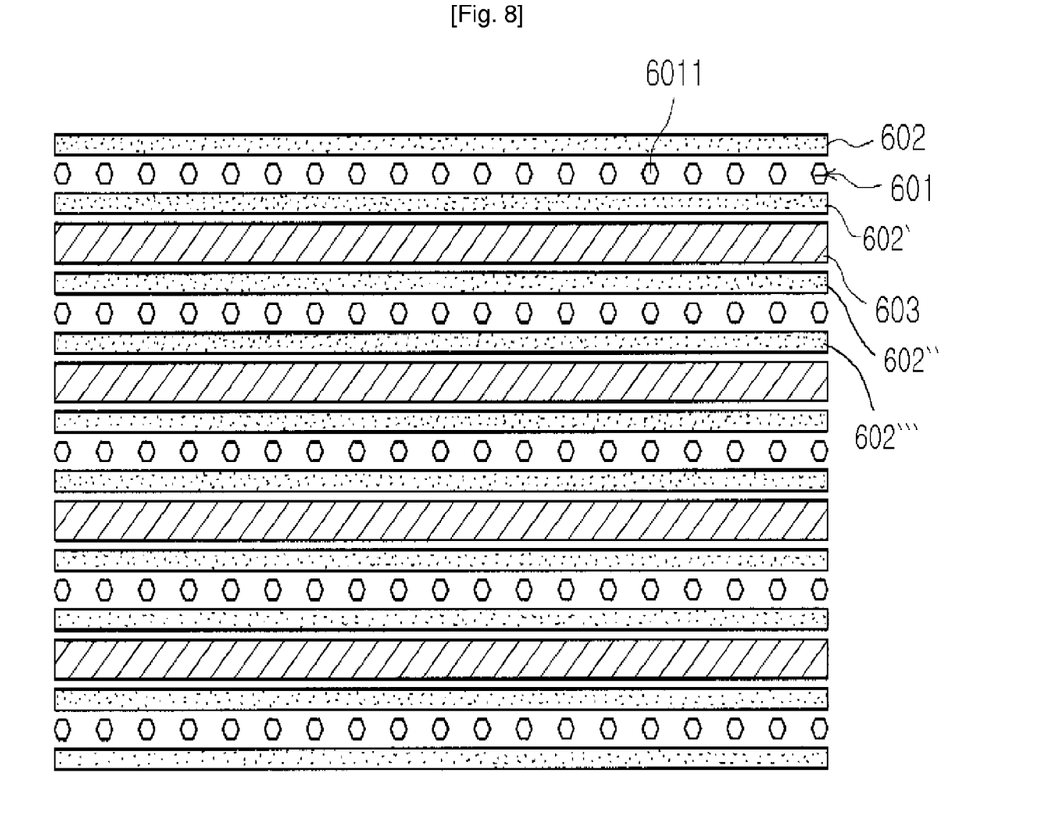
FIG. 8 is a schematic diagram illustrating the arrangement of components when manufacturing the segment in accordance with one embodiment of the present invention.

In a method for manufacturing the segment according to one embodiment of the invention, as shown in FIG. 8, diamond particles 6011 are arranged to form a layer of diamond particles 601 on a first soft metal matrix 602 among the plate-shaped soft metal matrices prepared as described above, and then a second soft metal matrix 602' is stacked thereon.

Then, a first hard metal matrix 603 among the plate-shaped hard metal matrices is stacked on the soft metal matrix 602', and a third soft metal matrix 602" is stacked on the first hard metal matrix 603.

Other diamond particles 6011 are arranged to form another layer of diamond particles 601 on the third soft metal matrix 602″, and a fourth soft metal matrix 602‴ is stacked on the other layer of diamond particles 601.

The above steps are repeated to provide a stack having a desired thickness.

In this manner, a segment as shown in FIG. 3 can be obtained.

Figure 9:
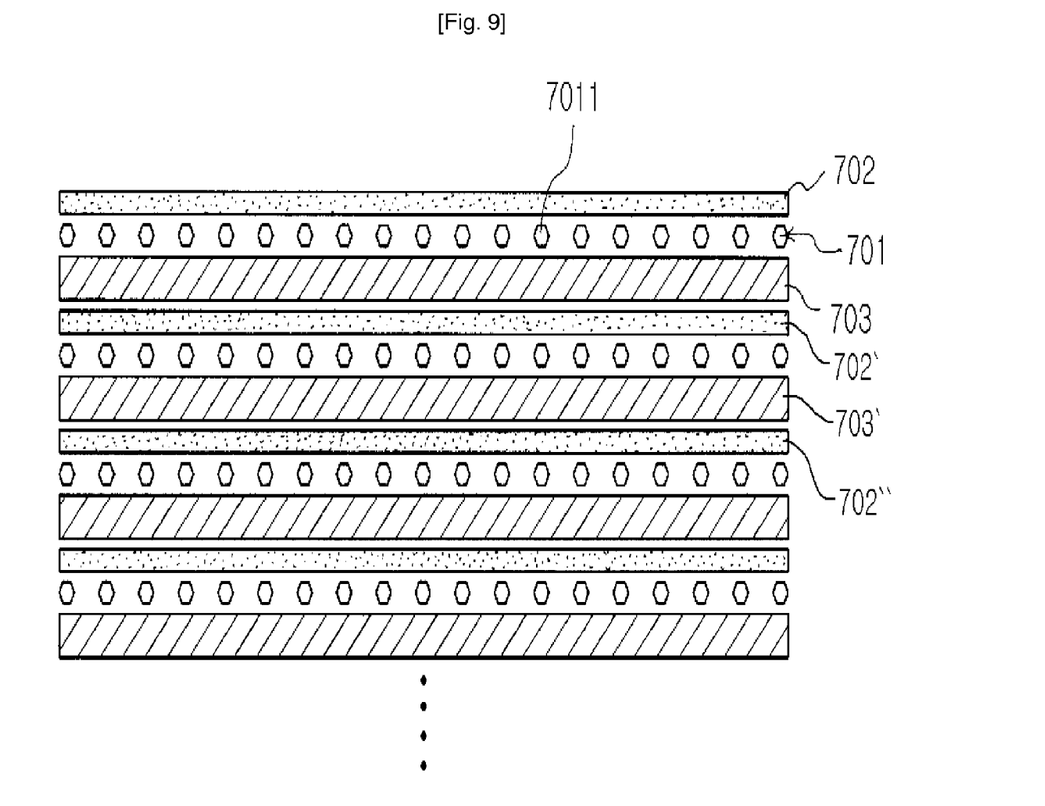
FIG. 9 is a schematic diagram illustrating the arrangement of components when manufacturing the segment in accordance with another embodiment of the present invention.

In a method for manufacturing the segment according to another embodiment of the invention, as shown in FIG. 9, diamond particles 7011 are arranged to form a layer of diamond particles 701 on a first soft metal matrix 702 among the plate-shaped soft metal matrices prepared as described above, and then a first hard metal matrix 703 and a second soft metal matrix 702' are sequentially stacked thereon.

Then, other diamond particles 7011 are arranged to form another layer of diamond particles 701 on the second soft metal matrix 702' and then a second hard metal matrix 703' and a third soft metal matrix 702″ are sequentially stacked thereon. These steps are repeated to provide a stack having a desired thickness.

In this manner, when the soft metal matrix 702, 702' or 702″ has a thickness greater than the hard metal matrix 703 or 703' a segment as shown in FIG. 5 can be obtained, and when the soft metal matrix 702, 702' or 702″ has a thickness smaller than the hard metal matrix 703 or 703', a segment as shown in FIG. 6 can be obtained.

Figure 10:
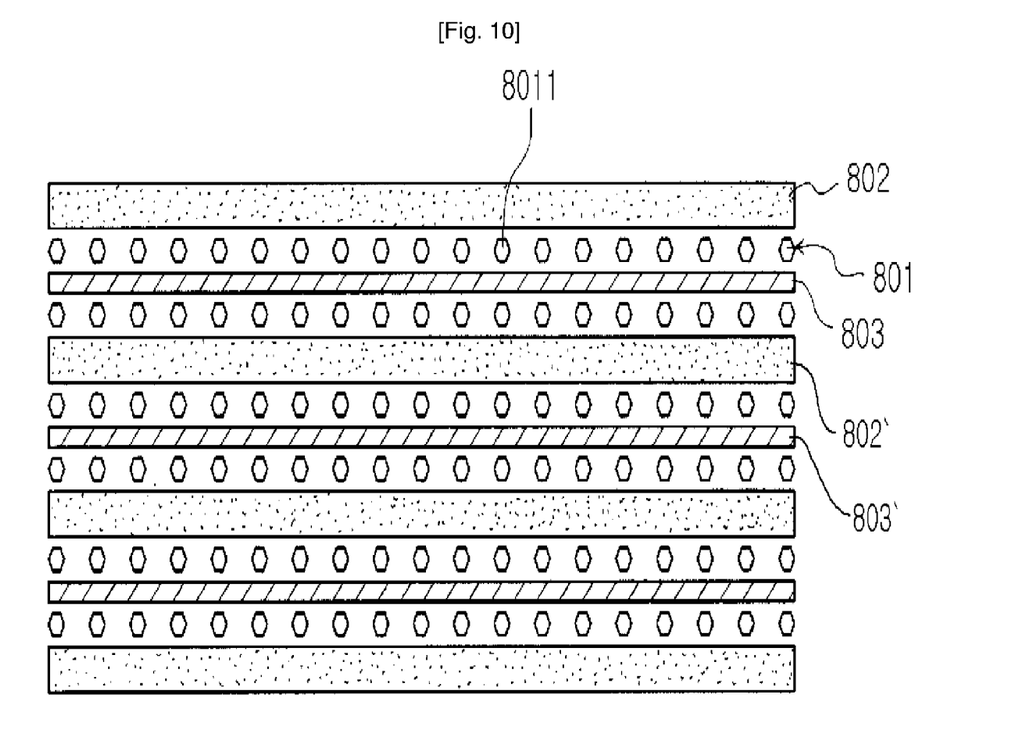
FIG. 10 is a schematic diagram illustrating the arrangement of components when manufacturing the segment in accordance with yet another embodiment of the present invention.

In a method for manufacturing the segment according to yet another embodiment of the invention, as shown in FIG. 10, diamond particles 8011 are arranged to form a layer of diamond particles 801 on a first soft metal matrix 802 among the plate-shaped soft metal matrices prepared as described above, and then a first hard metal matrix 803 is stacked thereon, followed by arranging other diamond particles 8011 to form another layer of diamond particles 801.

Then, a second soft metal matrix 802' is stacked on the other layer of diamond particles 801, followed by arranging other diamond particles 8011 to form still another layer of diamond particles 801 and stacking a second hard metal matrix 803' thereon. These steps are repeated to provide a stack having a desired thickness.

In this manner, a segment as shown in FIG. 7 can be obtained.

One example of a method for arranging the diamond particles on the plate-shaped metal matrix as described above will be described as follows.

First, spray type adhesives are applied onto a metal net cut to have the shape of the segment, and then a metal jig punctured to have holes uniformly spaced from each other by a laser is placed on the spray type adhesives, followed by scattering fine diamond particles thereon.

At this time, scattering of the fine diamond particles is performed such that each of the holes formed on the metal jig must receive one diamond particle.

By separating the metal jig therefrom, the metal net with the diamond particles uniformly arranged thereon is obtained.

The diamond particles can be arranged on the plate-shaped metal matrix by placing the metal net, having the diamond particles uniformly arranged thereon as described above, on one of the plate-shaped metal matrices.

As for another method of arranging the diamond particles, there can be suggested a method of arranging the diamond particles using a tape having an adhesive property.

Heating and Compressing the Stack

The laminate is heated and compressed such that components constituting the laminate are combined with each other, thereby providing the segment.

Unlike the powder compact, since the plate-shaped metal matrix has 100% relative density, heating and compressing are performed for combining the plate-shaped metal matrices.

Thus, it is not necessary to have the same conditions as those of general sintering.

Combining temperature and pressure supply energy enables metal elements on the surface of the plate-shaped metal matrix in one layer to combine with the metal elements on the surface of the plate-shaped metal matrix in different layers. Sintering is generally carried out at a temperature of 700~1,000° C. and a pressure of 350 kg/cm² for 5 minutes, and according to the invention, combining of the plate-shaped metal matrices is performed under these conditions.

The conditions for combining the plate-shaped metal matrices are varied according to not only the kind of the plate-shaped metal matrix but also surface conditions of the metal matrix.

When using the rolled material as the plate-shaped metal matrix, as a melting temperature of the rolled material is lowered and the surface of the plate-shaped metal matrix is cleared without an oxide film or extraneous substances, the combining temperature and pressure are lowered and the time for combining is reduced.

When the layers of the diamond particles are inserted between the plate-shaped metal matrices, a portion of each diamond particle is stuck into the plate-shaped metal matrices during the combining process.

When using the rolled material as the metal matrix, the combining pressure is determined depending on the yield strength of the plate-shaped metal matrix at a high temperature.

For instance, as the combining temperature is increased, the yield strength of the plate-shaped metal matrix is lowered, causing the combining pressure to be lowered in inverse proportion to the combining temperature.

Since different kinds of plate-shaped metal matrices have different melting points, they have different yield strengths at a high temperature.

It is possible to adjust the position of the diamond particles by adjusting a sintering temperature using such a property.

For example, when using a relatively soft plate-shaped metal matrix having a low melting point, the diamond particles are shifted toward the plate-shaped soft metal matrix in a thickness direction as is opposed to be shifted toward the relatively hard plate-shaped metal matrix having a high melting point.

When using the hot rolled steel plate or the cold rolled steel plate as the plate-shaped metal matrices, the yield strength of the steel plate is continuously reduced in inverse proportion to the temperature. Finally, the yield strength of the steel plate at 500° C. is reduced to about a half of the yield strength at room temperature, and most steel plates have a yield strength of 50 N/mm² at 800° C.

According to the experiment, it was found that at a temperature of 800° C. or more, the diamond particles were sufficiently stuck into the plate-shaped metal matrices at a pressure of 350 kg/cm², which is a general pressure for sintering.

If the relatively soft plate-shaped metal matrix has a thickness smaller than that of the diamond particles, the soft plate-shaped metal matrix is shifted towards the relatively hard plate-shaped metal matrix in a state of surrounding the diamond particles due to the high ductility thereof at high temperature. In these cases, the segments are formed as shown in FIGS. 3, 4 and 6.

In accordance with the invention, a cutting tool having the segments manufactured by the method as described above is provided.

INDUSTRIAL APPLICABILITY

As apparent from the above description, according to the present invention, there are advantageous effects in that as the plate-shaped metal matrices are used instead of the powdered matrices when manufacturing the cutting segment, manufacturing costs are reduced, resulting in reduced product costs, and the processes of mixing, granulating and forming of the metal matrices are omitted, thereby simplifying the manufacturing process, and thus remarkably enhancing productivity.

Further, there are advantageous effects in that as the plate-shaped metal matrices are used instead of the powdered matrices when manufacturing the segment, the diamond particles can be uniformly distributed, thereby providing a segment having excellent cutting ability and life span.

It should be understood that the embodiments and the accompanying drawings have been described for illustrative purposes, and the present invention is limited only by the following claims.

Further, those skilled in the art will appreciate that various modifications, additions and substitutions are allowed without departing from the scope and spirit of the invention according to the accompanying claims.

The invention claimed is:

1. A cutting segment, comprising:
a plurality of layers, each comprising layers of diamond particles, and two kinds of plate-shaped metal matrix layers comprising at least one soft metal matrix layer having relatively high ductility and at least one hard metal matrix layer having relatively low ductility, wherein the hard metal matrix layer is constructed of steel, and the soft metal matrix layer is constructed of a material selected from the group consisting of aluminum alloys, low melting point nickel alloys, copper alloys, silver alloys, and brass,
wherein the two kinds of plate-shaped metal matrix layers are arranged perpendicular to a cutting surface while being parallel to a cutting direction, and are alternately stacked perpendicular to the cutting direction, and
wherein each layer of diamond particles has diamond particles, a portion of each diamond particle being located in the soft metal matrix layer and the other portion of each diamond particle being located in the hard metal matrix layer, the diamond particles being positioned in a row of diamond particles on the cutting surface.

2. The segment according to claim 1, wherein the soft metal matrix layer has a thickness greater than that of the hard metal matrix layer.

3. The segment according to claim 1, wherein the soft metal matrix layer has a thickness smaller than that of the hard metal matrix layer.

4. The segment according to any one of claims 1, 2 and 3, wherein the plate-shaped metal matrix layers are constructed of a rolled material, a sintered material, or a combination of a rolled material and a sintered material.

5. The segment according to claim 4, wherein the plate-shaped metal matrix layers are constructed of a rolled material.

6. The segment according to claim 5, wherein the rolled material is a hot rolled steel plate or a cold rolled steel plate.

* * * * *

UNITED STATES PATENT AND TRADEMARK OFFICE
CERTIFICATE OF CORRECTION

PATENT NO. : 8,002,858 B2
APPLICATION NO. : 11/911510
DATED : August 23, 2011
INVENTOR(S) : Soo-kwang Kim et al.

It is certified that error appears in the above-identified patent and that said Letters Patent is hereby corrected as shown below:

In column 1: Add the following paragraph in the application after the title:

-- Cross-References to Related Applications

The present application is the National Stage of International Application No. PCT/KR2006/001382, filed on April 14, 2006, and claims the benefit of priority of Korean Patent Application No. 10-2005-0031112, filed on April 14, 2005. --

Signed and Sealed this
Twenty-second Day of May, 2012

David J. Kappos
*Director of the United States Patent and Trademark Office*